(12) United States Patent
Masefield et al.

(10) Patent No.: US 12,227,285 B2
(45) Date of Patent: *Feb. 18, 2025

(54) SYSTEM AND METHOD FOR CONTROLLING FLIGHT PATH OF A BLOWN LIFT AIRCRAFT

(71) Applicant: Electra Aero, Inc., Manassas, VA (US)

(72) Inventors: Oliver Masefield, Stans (CH);
Christopher B. Courtin, Fairfax Station, VA (US); Robert John Hansman, Jr., Cambridge, MA (US)

(73) Assignee: Electra Aero, Inc., Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,228

(22) Filed: Oct. 18, 2023

(65) Prior Publication Data
US 2024/0045447 A1 Feb. 8, 2024

Related U.S. Application Data

(63) Continuation of application No. 18/085,275, filed on Dec. 20, 2022.
(Continued)

(51) Int. Cl.
*B64D 31/06* (2024.01)
*B64C 13/04* (2006.01)
(Continued)

(52) U.S. Cl.
CPC .......... *B64C 13/0421* (2018.01); *B64D 27/24* (2013.01); *B64D 31/06* (2013.01);
(Continued)

(58) Field of Classification Search
CPC ........ B64C 13/04–0427; B64C 13/503; B64C 19/00; B64C 19/02; B64D 27/02;
(Continued)

(56) References Cited

U.S. PATENT DOCUMENTS

| 1,987,066 A | * | 1/1935 | Kingston | ............... | B64D 31/04 |
|  |  |  |  |  | 244/234 |
| 1,994,651 A | * | 3/1935 | Kingston | ............... | B64D 31/04 |
|  |  |  |  |  | 74/530 |

(Continued)

FOREIGN PATENT DOCUMENTS

| DE | 3626898 A1 | * | 2/1988 |  |  |
| WO | WO-2021224490 A1 | * | 11/2021 | ............. | B64D 27/02 |
| WO | 2023/122111 A1 |  | 6/2023 |  |  |

OTHER PUBLICATIONS

Burcham, Frank W., Jr., "Development and flight evaluation of an emergency digital flight control system using only engine thrust on an F-15 airplane", NASA Technical Paper 3627, Sep. 1996, 108 pages (Year: 1996).*

(Continued)

*Primary Examiner* — David A Testardi
(74) *Attorney, Agent, or Firm* — DUANE MORRIS LLP (57) ABSTRACT

In accordance with some embodiments, a system for controlling an aircraft is provided. The system can include a computing device, wherein the computing device includes at least one processor configured to control a flight path angle of the aircraft, and wherein the aircraft is a blown lift aircraft. The system can also include a control operator communicatively coupled to the computing device, wherein the control operator is configured to have at least two selectable settings. The system can also include at least two thrust-producing devices operatively coupled to a pair of wings on the aircraft and communicatively coupled to the computing device. The computing device may control the flight path angle of the aircraft by selectively operating the at least two thrust-producing devices based on a plurality of conditions provided by a plurality of sensors on the aircraft and a selected setting of the control operator.

18 Claims, 7 Drawing Sheets

Related U.S. Application Data (60) Provisional application No. 63/293,650, filed on Dec. 23, 2021.

(51) Int. Cl.
  *B64D 27/24*  (2006.01)
  *B64D 45/00*  (2006.01)
  *G05D 1/00*  (2006.01)
  *G05D 1/485*  (2024.01)

(52) U.S. Cl.
  CPC .......... *B64D 45/00* (2013.01); *G05D 1/0808* (2013.01); *G05D 1/485* (2024.01)

(58) Field of Classification Search
  CPC ........ B64D 27/04; B64D 27/24; B64D 31/04; B64D 31/06; G05D 1/06–0684; G05D 1/0808; G05D 1/0816; G05D 1/0825; G05D 1/0833; G05D 1/0841; G05D 1/485; G05G 1/06
  See application file for complete search history.

(56) References Cited

U.S. PATENT DOCUMENTS

| | | | | |
|---|---|---|---|---|
| 2,787,746 | A * | 4/1957 | Redmond | B64C 13/0427 244/236 |
| RE24,701 | E * | 9/1959 | Redmond | G05G 1/06 318/580 |
| 3,586,268 | A | 6/1971 | Melvin | |
| 3,850,388 | A | 11/1974 | Olcott et al. | |
| 3,970,829 | A | 7/1976 | Melvin | |
| 4,040,005 | A | 8/1977 | Melvin | |
| 4,373,184 | A * | 2/1983 | Lambregts | G01C 23/005 340/975 |
| 4,536,843 | A * | 8/1985 | Lambregts | G05D 1/0638 701/4 |
| 4,764,872 | A * | 8/1988 | Miller | G05D 1/0638 701/3 |
| 4,901,952 | A * | 2/1990 | Curtis | G05G 13/00 244/234 |
| 4,929,949 | A * | 5/1990 | Yamamoto | A63H 30/00 340/12.54 |
| 4,958,289 | A * | 9/1990 | Sum | B64C 11/305 701/99 |
| 5,000,404 | A * | 3/1991 | Martorella | G05D 1/0684 701/16 |
| 5,029,778 | A * | 7/1991 | DeLuca | B64D 31/02 244/175 |
| 5,039,037 | A * | 8/1991 | DeLuca | G05D 1/0061 244/175 |
| 5,065,962 | A * | 11/1991 | Adams | B64D 31/04 244/175 |
| 5,330,131 | A * | 7/1994 | Burcham | G05D 1/0077 244/76 R |
| 5,365,446 | A | 11/1994 | Farineau et al. | |
| 6,041,273 | A * | 3/2000 | Burken | B64D 31/06 244/75.1 |
| 6,062,513 | A * | 5/2000 | Lambregts | G05D 1/0638 244/175 |
| 6,102,330 | A * | 8/2000 | Burken | G05D 1/0808 244/184 |
| 6,340,289 | B1 | 1/2002 | Vos et al. | |
| 6,488,239 | B2 * | 12/2002 | Spitzer | G05G 1/40 244/234 |
| 7,711,455 | B1 * | 5/2010 | Cogan | G05D 1/0676 244/50 |
| 8,856,673 | B1 | 10/2014 | Dorfmann et al. | |
| 10,983,534 | B2 | 4/2021 | English et al. | |
| 2002/0121575 | A1 | 9/2002 | Greene | |
| 2002/0158168 | A1 | 10/2002 | Greene | |
| 2009/0138144 | A1 | 5/2009 | Flannigan et al. | |
| 2009/0266940 | A1 * | 10/2009 | Miller | B64C 27/56 244/223 |
| 2010/0042267 | A1 | 2/2010 | Goodman et al. | |
| 2010/0302074 | A1 * | 12/2010 | Campagne | B64D 45/00 340/971 |
| 2012/0265374 | A1 * | 10/2012 | Yochum | G05D 1/0607 701/5 |
| 2013/0060406 | A1 * | 3/2013 | Christensen | G05D 1/0858 701/4 |
| 2013/0184900 | A1 | 7/2013 | Constans et al. | |
| 2013/0190949 | A1 | 7/2013 | Constans et al. | |
| 2014/0346280 | A1 | 11/2014 | Constans et al. | |
| 2015/0083850 | A1 | 3/2015 | Moser et al. | |
| 2015/0088340 | A1 | 3/2015 | Moser et al. | |
| 2015/0102166 | A1 | 4/2015 | Moser et al. | |
| 2015/0105945 | A1 | 4/2015 | Moser et al. | |
| 2015/0360767 | A1 | 12/2015 | Lissajoux et al. | |
| 2015/0360789 | A1 | 12/2015 | Lissajoux et al. | |
| 2016/0332741 | A1 | 11/2016 | Moxon | |
| 2017/0190435 | A1 * | 7/2017 | Kobayashi | H02P 29/10 |
| 2017/0305571 | A1 | 10/2017 | Constans et al. | |
| 2017/0323571 | A1 | 11/2017 | Lissajoux et al. | |
| 2018/0127104 | A1 * | 5/2018 | Kobayashi | B64D 27/24 |
| 2019/0032577 | A1 * | 1/2019 | Cipolla | F02C 9/44 |
| 2020/0198796 | A1 | 6/2020 | Melendez et al. | |
| 2020/0216164 | A1 * | 7/2020 | Gibson | B64C 13/0421 |
| 2020/0264010 | A1 | 8/2020 | Hewitt et al. | |
| 2020/0290742 | A1 * | 9/2020 | Kumar | B64D 27/24 |
| 2021/0065558 | A1 | 3/2021 | Melendez et al. | |
| 2021/0088356 | A1 * | 3/2021 | Glomski | G08G 5/025 |
| 2021/0103297 | A1 | 4/2021 | Fillingham et al. | |
| 2021/0139141 | A1 | 5/2021 | St. Clair et al. | |
| 2021/0141394 | A1 | 5/2021 | Melendez et al. | |
| 2021/0254556 | A1 * | 8/2021 | Asselin | B64D 27/24 |
| 2021/0261245 | A1 | 8/2021 | Tao | |
| 2021/0294355 | A1 | 9/2021 | English et al. | |
| 2021/0333806 | A1 * | 10/2021 | Urbanec | G01C 21/20 |
| 2021/0347473 | A1 | 11/2021 | Dietrich et al. | |
| 2021/0380223 | A1 | 12/2021 | English et al. | |
| 2022/0011783 | A1 | 1/2022 | Groden et al. | |
| 2022/0234745 | A1 * | 7/2022 | Abramov | B64C 29/0025 |
| 2022/0258871 | A1 * | 8/2022 | Long | G05G 5/065 |
| 2022/0291683 | A1 * | 9/2022 | Bacic | B60L 50/70 |
| 2022/0292987 | A1 * | 9/2022 | Bacic | G08G 5/003 |
| 2022/0292991 | A1 * | 9/2022 | Bacic | G05D 1/0202 |
| 2022/0340294 | A1 * | 10/2022 | Le Borloch | B64D 31/04 |
| 2022/0363401 | A1 * | 11/2022 | Wiegman | B64C 29/0016 |
| 2022/0412287 | A1 * | 12/2022 | Miralles | F02C 9/00 |
| 2023/0205229 | A1 | 6/2023 | Masefield et al. | |
| 2023/0280764 | A1 | 9/2023 | Hansman, Jr. et al. | |

OTHER PUBLICATIONS

Burcham, Frank W., Jr. et al., "Simulator Evaluation of Simplified Propulsion-Only Emergency Flight Control Systems on Transport Aircraft", Technical Memorandum NASA/TM-1999-206578, Jun. 1999, 49 pages (41 numbered pages) (Year: 1999).*

"Dassault injects Falcon 10X with Fighter Technology," Australian Flying published Jul. 3, 2023 (3 pages). https://www.australianflying.com.au/latest/dassault-injects-falcon-10x-w.

Thurber, M., "Dassault Picks 10X for First Falcon Smart Throttle Platform," Business Aviation, Sep. 5, 2021(9 pages). https://www.ainonline.com/aviation-news/business-aviation/2021-09-05.

"Single Lever Power Control for General Aviation and Unmanned Aircraft," Glenn Research Center 1994 Phase II, (2 pages). https://sbir.nasa.gov/SBIR/successes/ss/3-031text.html, (1994).

Musgrave, Jeffrey L., "Single-Lever Power Control for General Aviation Aircraft Promises Improved Efficiency and Simpified Pilot Controls," The AGATE Flier, II(1), May 1996 (3 pages).

"Three levers in one," Design News, Sep. 7, 1998 (2 pages). https://www.designnews.com/three-levers-one.

Aurora Flight Services Corporation, "Single Lever Power Control for General Aviation and Unmanned Aircraft," NASA SBIR 1994 (1 page abstract), (1994).

Apr. 3, 2023 PCT Transmittal of the International Search Report and the Written Opinion of the International Searching Authority for PCT International Application No. PCT/US2022/053546. (12 pages).

(56) References Cited

OTHER PUBLICATIONS

Gilyard, Glenn B. et al., "A Simulation Evaluation of a Four-Engine Jet Transport Using Engine Thrust Modulation for Flightpath Control", NASA Technical Memorandum 4324, 1991, 24 pages (1991).

Tavernetti, Leonard R., "The C-17: Modern Airlift Technology", SAE Technical Paper 911967, 1991, 12 pages, https://doi.org/10,4271/911967 (1991).

Burcham Jr., Frank W. et al., "Simulator Evaluation of Simplified Proulsion-Only Emergency Flight Control Systems on Transport Aircraft", Technical Memorandum NASA/TM-1999-206578, Jun. 1999, 49 pages (41 numbered pages).

Gnadt, Albert R. et al., "Hybrid Turbo-Electric STOL Aircraft for Urban Air Mobility", AIAA Scitech 2019 Forum, Jan. 7-11, 2019, San Diego, Califonria, 10.2514/6.2019-0531, 22 pages (Year: 2019).

Shah, Avni, "Electric Propulsion: The Future of Sustainable Aviation", USC Viterbi, School of Engineering, Jul. 23, 2021 5 pages, https://viterbischool.usc.edu/news/2021/07/electrical-propulsion-the-future-of-sustainable-aviation/.

Combat Flight Center SOH Forum Post, "C-17s land on their backside", by PRB Senior Administrator, Apr. 16, 2016, 8 pages, downloaded from: http://www.sim-outhouse.com/sohforums/showthread.php/100047-C-17s-land-on-their-backside (Year: 2016).

Sep. 27, 2024 Final Office Action issued by the U.S. Patent and Trademark Office for U.S. Appl. No. 18/085,275. (14 pages).

Jun. 20, 2024 PCT International Preliminary Report on Patentability issued by the International Bureau of WIPO for PCT International Application No. PCT/US2022/053546. (7pages).

Feb. 27, 2024 Non-Final Office Action issued by the U.S. Patent and Trademark Office for U.S. Appl. No. 18/085,275. (32 pages).

Mar. 27, 2023 Non-Final Office Action issued by the U.S. Patent and Trademark Office for U.S. Appl. No. 18/085,275. (34 pages).

* cited by examiner

SYSTEM AND METHOD FOR CONTROLLING FLIGHT PATH OF A BLOWN LIFT AIRCRAFT

CROSS REFERENCE TO RELATED APPLICATIONS

This application claims the benefit of priority under 35 U.S.C. § 119(e) to prior U.S. Provisional Application No. 63/293,650 filed on Dec. 23, 2021, the disclosure of which is incorporated by reference herein in its entirety.

FIELD OF DISCLOSURE

The present disclosure generally relates to the field of aviation. More specifically, the present disclosure relates to controlling an aircraft's flight path based on the aircraft's mode of operation by collectively or individually controlling the thrust produced by thrust-producing devices.

BACKGROUND

Traditionally, an aircraft flight path is controlled by the pilot using a single power lever for each engine in combination with pitch control to stabilize the airspeed. As the power lever is deflected from the stop point, the engine produces more thrust. For an aircraft with multiple engines, this is done for every power lever until the desired power is reached for each engine. This process, carried out by the pilot, is an iterative process based on the mode of operation the aircraft is in (takeoff, cruise, landing, taxi, etc.) and a variety of factors such as aircraft configuration changes and environmental factors.

This process can be burdensome on the pilot as the number of engines are added to the aircraft. For instance, a blown lift aircraft with multiple electric propulsion units (EPU) that form a distributed electric propulsion (DEP) system can have significantly more than four EPUs. With traditional aircraft propulsion systems, the pilot would have to operate the power lever for each EPU individually until the selected power or thrust level is reached and the aircraft stabilized on the desired flight path. Not only does this require more work and concentration for the pilot, but the levers can take up a significant amount of room in a cockpit.

Additionally, achieving a desired flight path can be counterintuitive for a blown lift aircraft compared to a more conventional aircraft, because the power controls may be used in a contradictory manner compared to their function in a conventional aircraft. Specifically, slowing down the aircraft during the final stages of approach and landing require additional lift which is achieved by increasing the power or thrust level in a blown lift aircraft, which is instinctively counterintuitive.

In addition to adjusting the power to maintain a flight path, the pilot of a typical aircraft also maintains the correct approach speed using elevator and trim tab adjustments. The trim is typically set for the target approach speed, and the vehicle speed is maintained or modified by the pilot using control yoke inputs to adjust the pitch attitude. This speed target is based on a margin from the vehicle stall speed, which typically has little or no variation with power. These adjustments will also change as the aircraft configuration changes, such as deploying the landing gear and extending the flaps. In traditional aircraft, the pilot has to make all of these changes individually with various controls throughout the cockpit that control different elements of the aircraft in order to achieve the desired mode of operation.

In a blown lift aircraft, operating at takeoff and landing speeds, even small changes in airspeed can require significant adjustments to pitch attitude, trim setting and power setting. Additionally, the blowing reduces the stall speed which therefore varies significantly with propulsive power. At very low speeds an inappropriate reduction in power can cause the airplane to stall. Further, because the drag increases as speed is reduced additional power must be added as speed is reduced to maintain the flight path. This behavior is commonly referred to as the "back side of the power curve". Because most aircraft operate on the "front side of the power curve" where an increase in power results in an increase in speed the low speed blown lift power settings are complex, unusual and not intuitive to the pilot.

The present disclosure addresses these challenges and problems for blown lift aircraft such that a single control operator system can be used to directly control the flight path angle of the aircraft by controlling each of the thrust producing devices individually through appropriate algorithms, lookup tables, and/or a machine learned model(s), as required by the selected mode of operation. Embodiments of the present disclosure simplifies the operation of the aircraft for the pilot, provides additional safety, and have the additional advantage of reducing the complexity of the cockpit controls.

SUMMARY OF THE DISCLOSURE

In accordance with some embodiments, a system for controlling an aircraft is provided. The system can include a computing device, wherein the computing device includes at least one processor configured to control a flight path angle of the aircraft, and wherein the aircraft is a blown lift aircraft. The system can also include a control operator communicatively coupled to the computing device, wherein the control operator is configured to have at least two selectable settings. The system can also include at least two thrust-producing devices operatively coupled to a pair of wings on the aircraft and communicatively coupled to the computing device. The computing device may control the flight path angle of the aircraft by selectively operating the at least two thrust-producing devices based on a plurality of conditions provided by a plurality of sensors on the aircraft and a selected setting of the control operator.

In accordance with some embodiments, a method for controlling an aircraft is provided. The method can include receiving, at a computing device, a selected setting from a control operator. The control operator may have at least two selectable settings and may be communicatively coupled to the computing device. The computing device may contain at least one processor configured to control a flight path angle of a blown lift aircraft. The method can also include evaluating a plurality of conditions from a plurality of sensors on the aircraft. The method can further include controlling the flight path angle of the aircraft by selectively operating at least two thrust-producing devices communicatively coupled to the computing device based at least in part on the evaluation of the plurality of conditions and a control operator setting from the at least two selectable settings.

In accordance with some embodiments, a non-transitory computer readable medium having instructions stored thereon is provided. The instructions, when executed by at least one processor, may cause a computing device to perform operations. The operations can include receiving a selected setting of a control operator. The control operator can have at least two selectable settings. The operations can also include evaluating a plurality of conditions from a plurality of sensors. The operations may further include, based at least in part on the evaluation of the plurality of conditions from a plurality of sensors and the selected setting of the control operator from the at least two selectable settings, controlling a flight path angle of a blown lift aircraft by selectively operating at least two thrust-producing devices communicatively coupled to the computing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

The present disclosure is directed to a system and method to control the flight path of an aircraft. The system includes a control operator, such as a lever, that will direct the power level of a blown lift aircraft propulsion system to achieve a target flight path associated with a selected mode of operation, and in some embodiments an automatic method of maintaining the vehicle target airspeed. According to various embodiments, the control operator is used on an aircraft with electric propulsion having short takeoff and landing (eSTOL) capabilities, but could be used with other vertical takeoff and landing (e.g., VTOL) capabilities. In other embodiments, the control operator can be used with a conventional aircraft with conventional means for producing thrust.

A blown lift aircraft, in some embodiments, generally refers to an aircraft that comprises at least two thrust-producing devices disposed along a pair of wings on the aircraft. The thrust-producing devices develop slipstreams that blow over a substantial portion of the wing and augment the lift generated. In some embodiments the control surfaces of the aircraft, such as the flaps and ailerons (or flaperons), may be deflected or drooped to interact with the slipstreams from the thrust-producing devices further augmenting the lift produced. Further disclosure of a blown lift aircraft can be found in U.S. patent application Ser. No. 17/560,383 filed on Dec. 23, 2021, the disclosure of which is incorporated by reference herein in its entirety.

Figure 1:
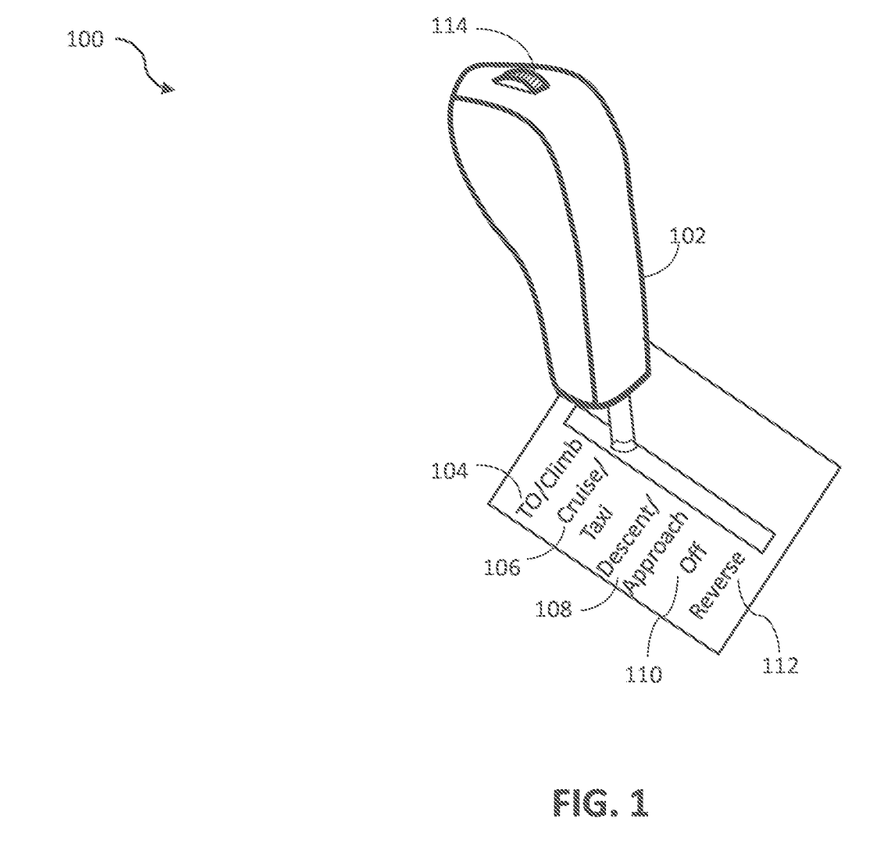
FIG. 1 is an isometric view of a control operator system in accordance with some embodiments.

FIG. 1 is an isometric view of a control operator system 100 in accordance with some embodiments. The control operator system 100 includes a control operator 102 able to travel through at least two predefined selectable positions. The control operator system 100 will have at least two selectable predefined positions, and may include at least five selectable predefined positions. The selectable predefined positions can include takeoff/climb (TO/Climb) 104, Cruise/Taxi 106, Descent/Approach 108, Off 110, and Reverse 112 corresponding to the mode of operation of the aircraft.

The different mode of operation positions of the control operator 102 can be shifted during all states of flight and while on the ground. Although several predefined positions are listed, it would be obvious to a person of ordinary skill in the art that other predefined positions may be listed and the aforementioned list is not exhaustive of all the potential predefined positions. According to some embodiments, the control operator 102 will also include a tunable adjuster 114, such as a thumbwheel or rotary switch, operatively coupled to the control operator 102, which is configured to fine-tune the power level of the thrust-producing devices, such as EPU(s). The EPU(s) power level may be symmetric to all EPU(s) or may be applied differentially. In some embodiments, EPU(s) could be mounted to the tail of the aircraft.

Figure 2:
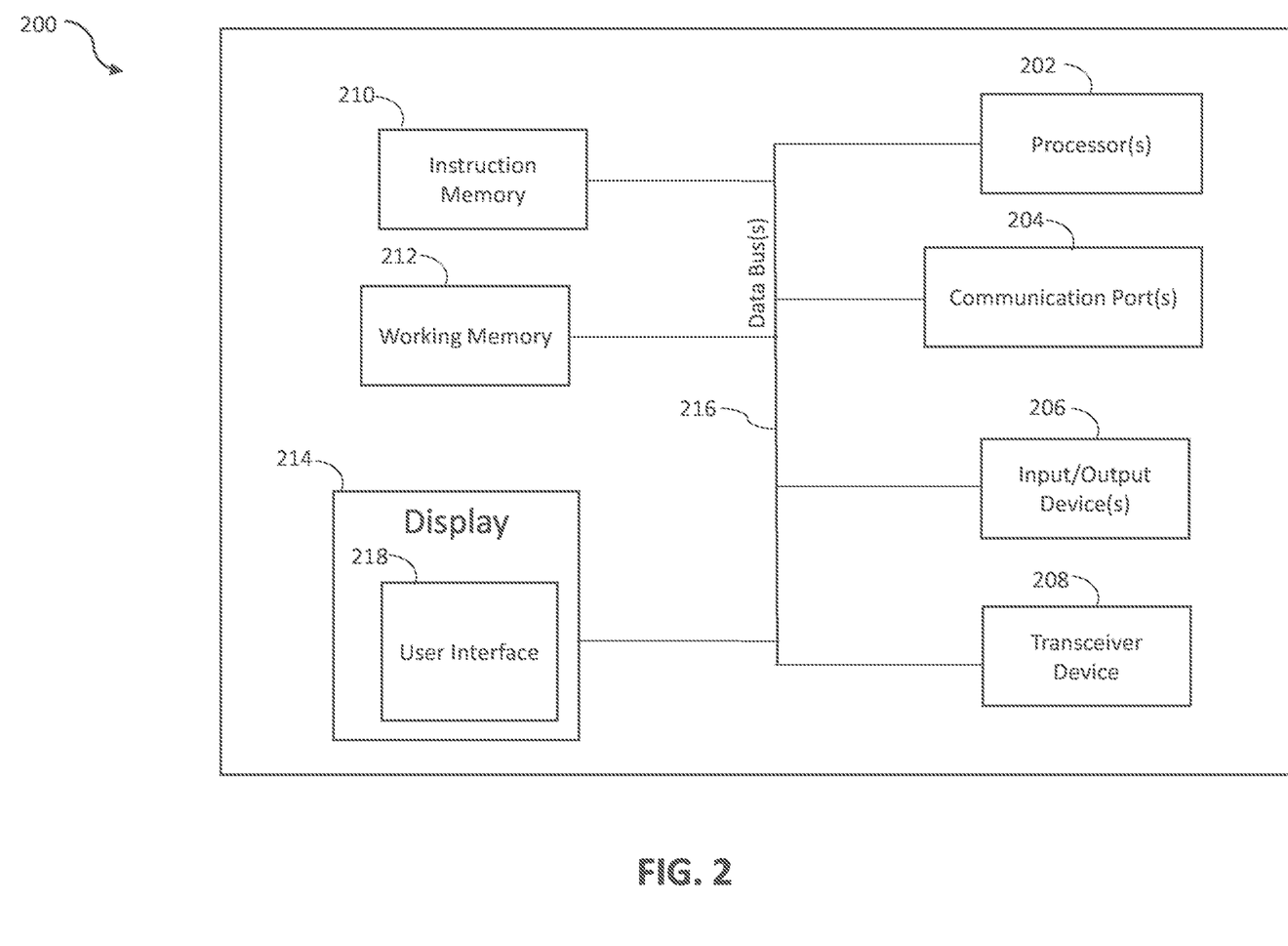
FIG. 2 is a block diagram of an example computing device in accordance with some embodiments.

FIG. 2 is a block diagram of an example computing device 200 in accordance with some embodiments. The computing device 200 that can be employed by a disclosed system or used to execute a disclosed method. Computing device 200, such as the Power Management Computer (PMC) 302 in FIG. 3, can implement, for example, one or more of the functions described herein. It should be understood, however, that other computing device configurations are possible.

Computing device 200 can include one or more processors 202, one or more communication port(s) 204, one or more input/output devices 206, a transceiver 208, instruction memory 210, working memory 212, and optionally a display 214, all operatively coupled to one or more data buses 216. Data buses 216 allow for communication among the various devices, processor(s) 202, instruction memory 210, working memory 212, communication port(s) 204, and/or display 214. Data buses 216 can include wired, or wireless, communication channels. Data buses 216 are connected to one or more devices.

Processor(s) 202 can include one or more distinct processors, each having one or more cores. Each of the distinct processors can have the same or different structures. Processor(s) 202 can include one or more central processing units (CPUs), one or more graphics processing units (GPUs), application specific integrated circuits (ASICs), digital signal processors (DSPs), and the like.

Processor(s) 202 can be configured to perform a certain function or operation by executing code, stored on instruction memory 210, embodying the function or operation of the flight path control system 300 illustrated in FIG. 3 and discussed below. For example, processor(s) 202 can be configured to perform one or more of any function, method, or operation disclosed herein.

Communication port(s) 204 can include, for example, a serial port such as a universal asynchronous receiver/transmitter (UART) connection, a Universal Serial Bus (USB) connection, or any other suitable communication port or connection. In some examples, communication port(s) 204 allows for the programming of executable instructions in instruction memory 210. In some examples, communication port(s) 204 allow for the transfer, such as uploading or downloading, of data.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Transceiver 208 can allow for communication with a network, such as a WiFi network, an Ethernet network, a cellular network, or any other suitable communication network. For example, if operating in a cellular network, transceiver 208 is configured to allow communications with the cellular network. Processor(s) 202 is operable to receive data from, or send data to, a network via transceiver 208.

Instruction memory 210 can include an instruction memory 210 that can store instructions that can be accessed (e.g., read) and executed by processor(s) 202. For example, the instruction memory 210 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 210 can store instructions that, when executed by one or more processors 202, cause one or more processors 202 to perform one or more of the operations of a flight path control system 300.

In addition to instruction memory 210, the computing device 200 can also include a working memory 212. Processor(s) 202 can store data to, and read data from, the working memory 212. For example, processor(s) 202 can store a working set of instructions to the working memory 212, such as instructions loaded from the instruction memory 210. Processor(s) 202 can also use the working memory 212 to store dynamic data created during the operation of computing device 200. The working memory 212 can be a random access memory (RAM) such as a static random access memory (SRAM) or dynamic random access memory (DRAM), or any other suitable memory.

Display 214 is configured to display user interface 218. User interface 218 can enable user interaction with computing device 200. In some examples, a user can interact with user interface 218 by engaging input/output devices 206. In some examples, display 214 can be a touchscreen, where user interface 218 is displayed on the touchscreen.

Figure 3:
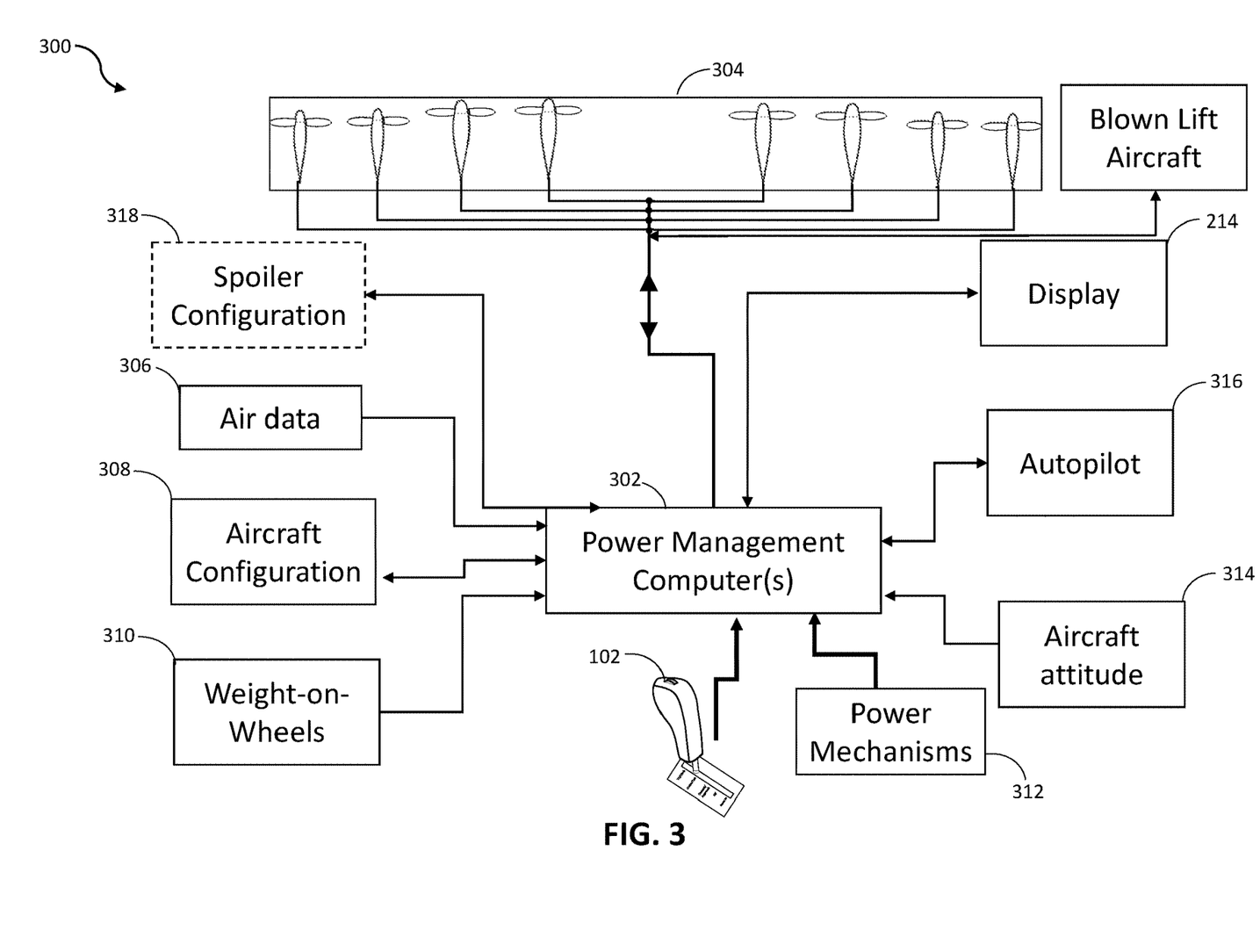
FIG. 3 is a block diagram of an example flight path control system in accordance with some embodiments.

FIG. 3 is a block diagram of an example flight path control system 300 in accordance with some embodiments. The flight path control system 300 includes one or more power management computers PMC(s) 302 configured to control at least two thrust-producing devices 304, such as propellers, based on the selectable position of control operator 102 and a plurality of conditions from a plurality of sensors around the aircraft, in order to achieve a desired flight path angle. The plurality of conditions includes various aircraft and flight parameters used to calculate the desired power level for the thrust-producing devices 304, to achieve the target flight path angle. The plurality of conditions may include an air data module 306, an aircraft configuration module 308, a weight-on-wheels module 310 of the aircraft, two or more power mechanism 312 positions for the at least two thrust-producing devices, an aircraft attitude module 314, the settings from an autopilot (A/P) module 316, and optionally a spoiler module 318. A person of ordinary skill in the art will appreciate that a variety of additional inputs may be provided to the PMC(s) 302 for calculating the desired power levels and achieving the target flight path angle.

In various embodiments, air data module 306 is configured to be processed by the PMC(s) 302 from a plurality of on-board sensors such as pitot and static probes, angle of attack and sideslip probes, total or static air temperature probes, radar altimeter, normal acceleration and global positioning system (GPS) data based on altitude, position, and atmospheric conditions. In various embodiments, additional data may be obtained from satellite or terrestrial transmitters. A person of ordinary skill in the art will appreciate that various sensors may be used and the above-mentioned list is not exhaustive or limiting. The sensors will provide information about the aircraft's airspeed, altitude (density and physical), and velocity vector. The information can then be processed by the PMC(s) 302 or pre-processors to the PMC(s) 302 to establish the desired aircraft rate and angle of climb or descent. In various embodiments, the air data module 306 is operatively coupled to the aircraft configuration module 308 and, together with an input on the current aircraft weight, calculate the airspeed margin above the stall speed based on the aircraft configuration (i.e., flap deflection, aileron/flaperon deflection, etc.), which can be used to provide optimum targets for the selected mode of operation or mode of operation. The aforementioned optimum targets may include a desired power level for the thrust-producing devices 304, including commanding different power levels for the inboard and outboard thrust-producing devices 304 as necessary depending on various aircraft maneuvers and failure scenarios. In some embodiments, the aforementioned data is communicated to the display 214. For example, the output can be graphically displayed on a user interface 218 via the display 214 to show various flight parameters (speed, altitude, temperature, Mach number, flight path angle, etc.) associated with the on-board sensors as well the computed target flight path angle. In various embodiments the air data module 306 is configured to be an input to the autopilot module 316, or fly-by-wire system, in order to stabilize the aircraft speed or angle of attack during the approach and landing phases of flight.

According to some embodiments, aircraft data such as flap deflection, aileron droop angles, slat extension, trim settings, landing gear extension, aircraft weight, and center of gravity will be processed by the aircraft configuration module 308 and be received via the PMC(s) 302 to be used in the overall calculation of target thrust-producing device 304 power level to achieve the commanded flight path angle. In various embodiments, the flap, slat, and/or landing gear extension will determine the lift, drag, and pitching moment information of the aircraft from reference algorithms, lookup tables, and/or machine learned models. The lift information can be used to calculate the margin to the minimum safe flight speed as a function of the thrust-producing device 304 power level. The PMC(s) 302 is configured to use the actual status information of the aircraft configuration (i.e., flap deflection, aileron/flaperon deflection, etc.) to control the thrust-producing device 304 power level according to a calculation method such as lookup tables, referencing an algorithm, and/or utilizing a machine learned model to achieve the desired flight path angle or target state.

According to various embodiments, the weight-on-wheels module 310 may be used to indicate, by a weight-on wheels signal, if the aircraft is firmly on the ground (or in the air) using a "squat switch", wheel speed sensors, or other device that can determine the aircraft ground status. In other embodiments, there may be a plurality of switches or sensors for redundancy. The weight-on-wheels module 310 may be verified with plausibility checks using a radar altimeter (RadAlt) or airspeed data. The weight-on-wheels module 310 may be used by the PMC(s) 302 and other input modules to determine the thrust-producing device 304 power levels for takeoff, landing, braking, and taxiing. For example, for a positive weight-on-wheels signal from the weight-on-wheels module 310 the PMC(s) 302 may allow reverse thrust to be applied through the thrust-producing devices 304. Additionally, a positive weight-on-wheels signal may allow taxi power to be applied through the thrust-producing devices 304 instead of cruise power.

Additionally, according to various embodiments, two or more power mechanisms 312 corresponding to the two or more thrust-producing devices, such as switches or circuit breakers, may be used by the pilot to manually shut off power to the thrust-producing devices 304 as needed. The two or more power mechanism 312 positions, such as "On" or "Off", can be used by the PMC(s) 302 to calculate the needed power level of the thrust-producing devices 304. For example, if the position of one of the power mechanisms 312 is in the "Off" position then the PMC(s) 302 may need to raise the power level of at least one thrust-producing on the same side of the aircraft as the one that corresponds to the thrust-producing device with its corresponding power mechanism 312 in the "Off" position in order to maintain the target flight path angle.

In some embodiments, the flight path control system 300 also includes an aircraft attitude module 314 in order to provide the PMC(s) 302 with the attitude of the aircraft. The attitude of the aircraft may be provided from a plurality of sensors such as an Attitude Heading Reference System (AHRS), a gyro, Inertial Navigation System, and/or other similar systems. The aircraft attitude module 314 may work in conjunction with various data from the air data module 306 and/or the aircraft configuration module 308, and processed by the PMC(s) 302 in order to ensure the aircraft is maintained within acceptable values of pitch angles. For example, the air data module 306 may provide the airspeed of an aircraft and the aircraft configuration module 308 provides the position of an elevator, the PMC(s) 302 would process the data and could adjust the power level of the thrust-producing devices 304 as needed to maintain an acceptable pitch angle. The PMC(s) 302 may also use this data in conjunction with data from modules of FIG. 3 to power the thrust-producing devices 304 either together or differentially by commanding different power levels individually as needed.

In various embodiments, the autopilot module 316 is configured to provide information to the PMC(s) 302 of activation or status (i.e., if autopilot is on or off) and commanded flight phase or mode of operation of the autopilot module 316. In other embodiments, the autopilot module 316 may utilize one or more algorithms, lookup tables, and/or machine learned model within a fly-by-wire system. Yet in other embodiments, the autopilot module 316 is configured to receive input from the PMC(s) 302 and optimize the commanded flight phase as well as assist in holding airspeed, maintaining or adjusting angle of attack, and maintaining or changing flight altitude. The power level commanded to the thrust-producing devices 304 by the PMC(s) 302 may also be used by the autopilot module 316 based on the autopilot and/or control operator 102 selected position for mode of operation (e.g., Takeoff/Climb 104, Cruise/Taxi 106, Descent/Approach 108, Off 110, Reverse 112). According to various embodiments, the autopilot module 316 may be interchangeable with a fly-by-wire system or module.

In various embodiments, the display 214 is adapted to receive input from a variety of the modules identified in FIG. 3 through the PMC(s) 302 and is capable of displaying flight and systems information on user interface 218. The user interface 218 is configured to provide information in real-time, such as the plurality of conditions from the input data illustrated in FIG. 3. The user interface 218 may also contain soft-switches replacing the power mechanisms 312 used to shut off power to individual thrust-producing devices 304. The user interface 218 may be configured to provide flight indications such as visual flight information, the calculated target flight path, and power level for the thrust-producing devices 304 just to give a few examples. Although multiple flight indications are listed, it would be obvious to a person of ordinary skill in the art that other flight indications may also be displayed and the aforementioned list is not exhaustive of all flight indications. In some embodiments, the user interface 218 may be configured to show or alert the pilot of various problems or failure scenarios.

The flight path control system 300 optionally includes a spoiler module 318 depending on if the aircraft also includes spoilers. The spoiler module 318 may be configured to extend the spoilers to slow the aircraft and steepen the flight path as needed. The position of the spoilers may be sent by the spoiler module 318 and received by the PMC(s) 302 and/or controlled by the user interface 218 or a switch (not shown) in the cockpit. The spoiler extension and deflection status may be commanded by the PMC(s) 302 or fly-by-wire system (or autopilot module 316) through the spoiler module 318, and the status of the spoilers may be provided on the user interface 218.

In order for the PMC(s) 302 of the flight path control system 300 to command the desired power level of the thrust-producing devices 304 and achieve a target flight path angle of an aircraft, the PMC(s) 302 may use lookup tables, algorithms, and/or machine learned models. The lookup tables, algorithms, and/or machine learned models will be based on the selected position of the control operator 102 for the mode of operation (e.g., Takeoff/Climb 104, Cruise/Taxi 106, Descent/Approach 108, Off, 110, and Reverse 112) and the input data into the PMC(s) 302 (e.g., air data module 306, aircraft configuration module 308, weight-on-wheels module 310, power mechanism 312 positions, aircraft attitude module 314, autopilot module 316 settings, and/or spoiler module 318 configuration). The PMC(s) 302 will compute the required power for each of the thrust-producing devices 304 based on the input data mentioned above and the position of the control operator 102 to achieve a target flight path angle.

The PMC(s) 302 processes the input data mentioned above and illustrated in FIG. 3, and commands the desired thrust-producing device 304 power level based on the flight path angle requested by the selected position of the control operator 102. This power level to the thrust-producing devices 304 may differ between the inboard and outboard thrust-producing devices 304 depending on the mode of operation and the longitudinal maneuver of the aircraft. In some embodiments, the power level needed for the thrust-producing devices 304 will be estimated from the air data module 306, such as from the measured airspeed or angle of attack and vertical speed. In some embodiments, air data module 306 measurements will be used with a prebuilt model of the power required for various flight path angle and airspeed or angle of attack combinations. In some embodiments, the power levels will be commanded based on a measurement of the aircraft position relative to the runway. Of note, not all input module information from FIG. 3 may be needed for every mode of operation.

The algorithms used by the PMC(s) 302 determine the power level to achieve the target flight path angle or target state using the appropriate input data, as illustrated in FIG. 3, depending on the selected position of the control operator 102. In various embodiments, the PMC(s) 302 will continuously adjust the power level of the thrust-producing devices 304 based on any airspeed or angle of attack variations, in order to maintain the target flight path angle. The algorithms can include lookup tables based on aircraft performance and dynamics, closed loop feedback of input data, open loop gain, adaptive and heuristic algorithms. Some algorithms used by the PMC(s) 302 may use best-fit equations to define a preset mapping between power, airspeed, and desired flight path angle. As alternatives to algorithms, lookup tables may be used which contain the same input data into the PMC(s) 302 in tabular form and provide the power output of the thrust-producing devices 304. The lookup tables contain the same input functions as algorithms, but the answer is found through interpolation between each of the two-dimensional tables. In other embodiments of the flight path control system 300, a combination of algorithms and lookup tables, or similar open-loop methods of calculation may be used. Additional closed-loop control algorithms may be employed, and can include fixed- or scheduled-gain feedback based on airspeed, vertical speed, and/or sensed position relative to the runway. More sophisticated control approaches including non-linear or machine learned model-based controllers may also be employed in various embodiments. In some embodiments, the models may be a simplified form of the algorithm, where the result only approaches the desired result and the desired result is approached through further closed-loop iterations.

For example, an algorithm for the flight path angle during a descent or approach mode of operation may include input functions (f) that are combined to provide the required output based on design analysis, models, or flight testing. According to some embodiments, the algorithm for flight path angle is Flight Path Angle=f(weight, speed, power, flap configuration, gear configuration). The input functions to the Flight Path Angle algorithm may include a multiplier or separate equation to represent the applicable input function.

Figure 4A:
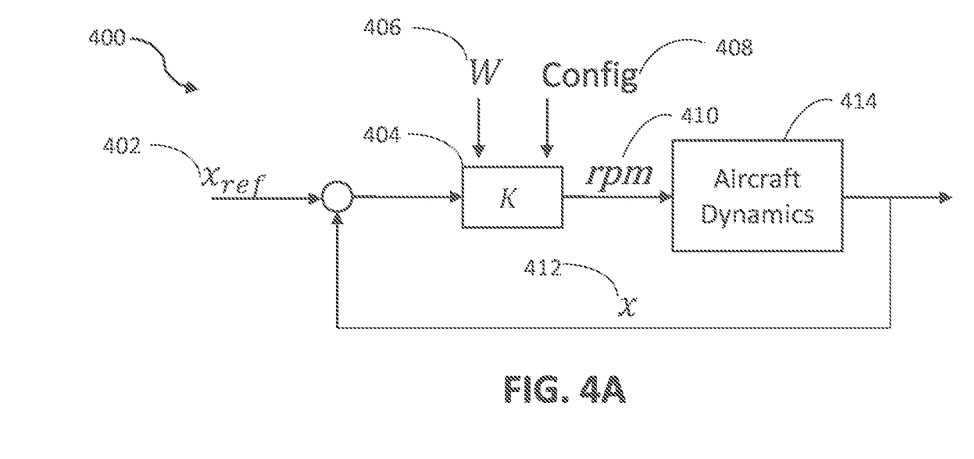
FIG. 4A is a block diagram for calculating the required power of the thrust-producing devices based on an algorithm in accordance with some embodiments.

FIG. 4A is a block diagram for calculating the required power of the thrust-producing devices based on an algorithm in accordance with some embodiments. The flight path control algorithm 400 may be implemented as a tracking controller based on a number of reference states ($x_{ref}$) 402. The reference states 402 may include the normal load factor, GPS location and altitude, vertical speed, or a combination of these or other reference states 402, which could be inputs from air data module 306. The feedback gain (K) 404 can be scheduled with the aircraft weight (W) 406 and aircraft configuration (Config) 408, such as flap, flaperon, and/or spoiler configuration. The aircraft weight 406 and aircraft configuration 408 may come from the inputs to the aircraft configuration module 308. In other embodiments, the feedback gain (K) 404 may be scheduled with airspeed or some other variable. The thrust-producing devices 304 power or RPM commands 410 are calculated based on the difference between the sensed state 412 based on aircraft dynamics 414 and the reference state 402. The feedback gain (K) 404, which may further be scheduled with variables such as aircraft weight 406 and aircraft configuration 408 from the aircraft configuration module 308. The RPM command 410 can be sent to all of the thrust-producing devices 304 simultaneously or differentially to specific thrust-producing devices.

Figure 4B:
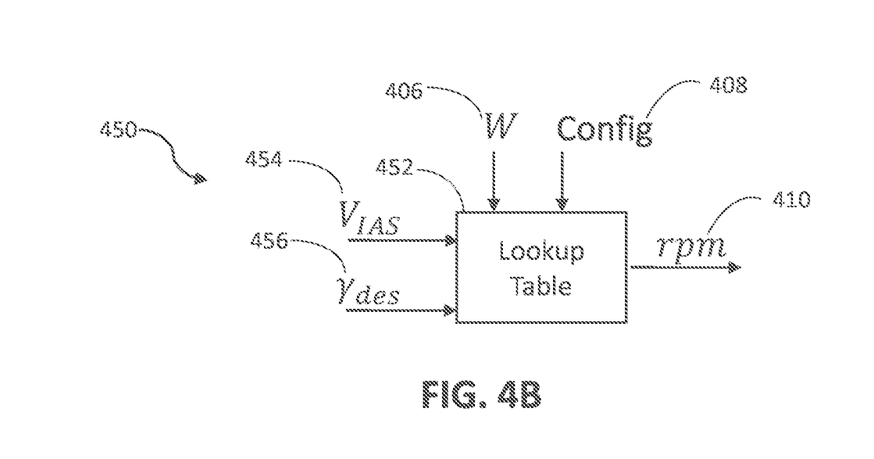
FIG. 4B is a block diagram for calculating the required power of the thrust-producing devices based on a lookup table in accordance with some embodiments.

FIG. 4B is a block diagram for calculating the required power of the thrust-producing devices based on a lookup table in accordance with some embodiments. The flight path control lookup table 450 may include lookup table 452 and a trim map that includes the indicated air speed of the aircraft ($V_{IAS}$) 454 from air data module 306 and the desired flight path angle ($\gamma_{des}$) 456 based on the selected position of the control operator 102. The lookup table 452 may also take inputs of the aircraft weight (W) 406 and the aircraft configuration (Config) 408, such as the weight and configuration data from the aircraft configuration module 308, to calculate the thrust-producing device's power or RPM command 410. The RPM command 410 can be sent to all of the thrust-producing devices 304 simultaneously or differentially to specific thrust-producing devices 304.

Figure 5:
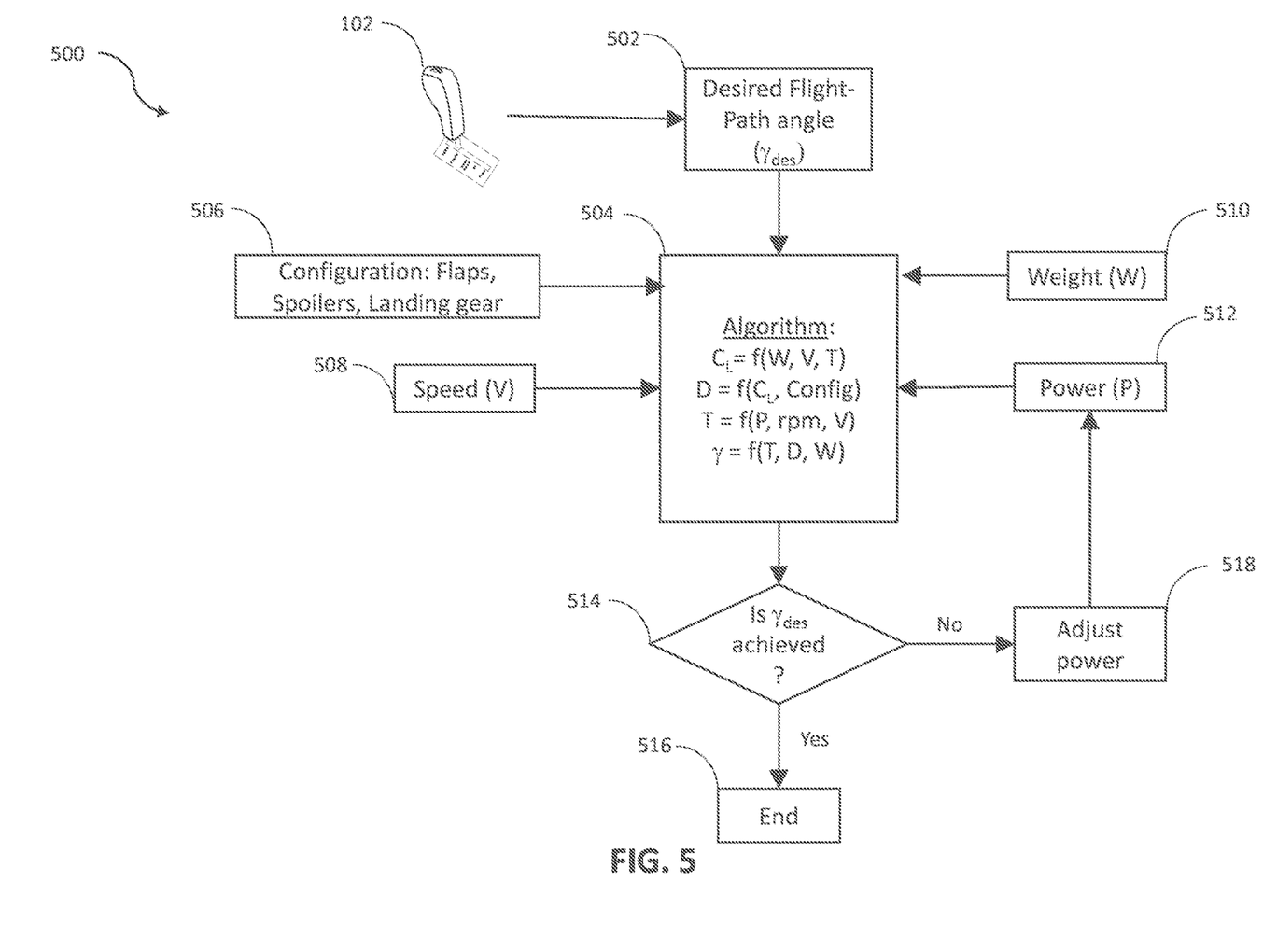
FIG. 5 is a flow chart block diagram for achieving a desired flight path angle in accordance with some embodiments.

FIG. 5 is a flow chart block diagram for achieving a desired flight path angle in accordance with some embodiments. The flow chart block diagram 500 for achieving the desired flight path angle starts with selecting one of the predefined selectable positions from the control operator 102. The selected predefined position of the control operator 102 (e.g., Takeoff/Climb 104, Cruise/Taxi 106, Descent/Approach 108, Off, 110, and Reverse 112) will determine the desired flight path angle ($\gamma_{des}$) at step 502. The PMC(s) 302 may then use various algorithms at step 504 to compute the necessary power or RPM command to ensure the desired flight path angle is achieved. The algorithms used in step 504 may include calculating the lift coefficient ($C_L$), drag (D), thrust (T), and/or flight path angle ($\gamma$). The inputs to the algorithms used in step 504 may include the aircraft configuration 506 (e.g., configuration of the flaps, spoilers, ailerons, and/or landing gear) from aircraft configuration module 308. The algorithms used in step 504 may also take into account the speed (V) 508 from the air data module 306, weight (W) 510 from the aircraft configuration module 308, and power (P) 512 (or RPM command) to the thrust-producing devices 304. The lift coefficient ($C_L$) algorithm may be a function of weight 510, speed 508, and thrust. The drag (D) algorithm may be a function of the lift coefficient (CO and the aircraft configuration (Config) 506 from the aircraft configuration module 308. The thrust (T) algorithm may be a function of speed (V) 508 from the air data module 306, and power (P) by controlling rpm. The flight path angle ($\gamma$) algorithm may be a function of thrust, drag, and weight 510 of the aircraft. In some embodiments, the algorithms in step 504 may be replaced with lookup tables as described above. The PMC(s) 302 will calculate the flight path angle ($\gamma$) from the algorithms in step 504 and compare to the desired flight path angle ($\gamma_{des}$) at step 514. If the desired flight path angle is achieved, then the process ends at step 516. However, if the desired flight path angle is not achieved at step 514 then power is adjusted in step 518 to change the thrust and ultimately the flight path angle of the aircraft.

In various embodiments, the power level of the thrust-producing devices 304 may change as aircraft configuration module 308 changes. For example, as a deflection in the flaps or aileron droop changes, the PMC(s) 302, through the use of the algorithms, lookup tables, and/or machine learned models discussed above, may command a change in power level of the thrust-producing devices 304. The aforementioned methods to determine the required power output for each thrust-producing device 304 are merely a few examples for carrying out the process. A person of ordinary skill in the art would appreciate and understand other ways to achieve the same results.

To provide a couple of examples, when the control operator 102 is in the Takeoff/Climb 104 position, the PMC(s) 302 may command necessary takeoff power to the desired thrust-producing devices 304, and the tunable adjuster 114 may command the maximum or economic climb for the aircraft from a tuning input when the tunable adjuster 114 is operated. In a further example, if the control operator 102 is taken to the Descent/Approach 108 position, the PMC(s) 302 may command the inboard and outboard thrust-producing devices 304 with differing power levels as needed for adequate control while landing the aircraft. Additionally, the position of the tunable adjuster 114 (or rotary switch) may be used to command the maximum or gentle descent of the aircraft while landing. If the control operator 102 is shifted to the Off 110 position, the PMC(s) 302 may shutoff power to all of the thrust-producing devices 304. In another example, when the control operator 102 is taken to Cruise/Taxi 106 position, the PMC(s) 302 may command the aircraft to a target cruise speed in flight or to a slow taxi speed when on the ground. Each of these target conditions can be modified with the position of the control operator 102 and fine-tuned with the tunable adjuster 114. If the position of the control operator 102 is taken to Reverse 112 position, the PMC(s) 302 may command a change in direction of the thrust-producing devices 304. For example, if the thrust-producing devices 304 are electric propulsion units (EPUs) comprising propellers, then when the control operator 102 is taken to the Reverse 112 position, the propellers of the EPU(s) are commanded to change pitch angle or reverse motor direction to allow for reverse thrust of the aircraft. Reverse thrust, activated by the Reverse 112 position, will typically only be used on the ground to minimize the landing ground roll to assist the wheel brakes. In some embodiments, the Reverse 112 position may be gated off or locked out to prevent from switching into reverse while in flight.

According to some embodiments, the control operator 102 is a physical lever in the cockpit operatively coupled to the PMC(s) 302. In other embodiments, the control operator 102 is a touchscreen feature on the user interface 218. In some embodiments, the tunable adjuster 114 may revert back to a pre-determined position when a new mode of operation is chosen by moving the control operator 102 to a different selectable pre-defined position. In further embodiments, the tunable adjuster 114 (or switch/thumbwheel) may be located on top of the control operator 102 (to be manipulated by the pilot's thumb) or placed elsewhere on the control operator 102 or in the cockpit of the aircraft (not shown).

In various embodiments, the PMC(s) 302 may be replaced with individual cards or software partitions in other computers. In some embodiments, the control lever may have more or less than five predefined positions. In additional embodiments, the control operator 102 may be configured for continuous travel to set target states instead of having predefined positions. In embodiments when the thrust-producing devices 304 are EPU(s) comprising propellers, when the control operator 102 is moved to the Off 110 position the propellers may feather or fold to reduce drag. In some embodiments, the Reverse 112 position command to the PMC(s) 302 may be blocked with a gate by the software while in flight. The release of the gate may be through a switch on the control operator 102, similar to a gear-shift in a conventional automobile. In some embodiments, the control operator 102 can be actuated so that it moves when the thrust-producing device 304 power is automatically commanded by the PMC(s) 302. In other embodiments, the control operator 102 could be used for coarse adjustment and the tunable adjuster 114 could be used for fine adjustment. In various embodiments, the control operator 102 and/or tunable adjuster 114 may be replaced with a touchpad, touchscreen, or mouse-like device. In some embodiments, the autopilot module 316 ensures that the airspeed or angle of attack is maintained at a constant value for the selected mode of operation and command pitch control, while the PMC(s) 302 maintains the commanded flight path angle to avoid dynamic coupling between pitch and power settings.

In the present disclosure the thrust-producing devices 304 typically only have local processing to convert the power commands into torque and revolutions per minute (RPM) on the motors. In an embodiment with EPU(s) comprising propellers, the EPU(s) may have processing to change propeller pitch. The EPU(s) may also have a built-in test function and may provide status feedback to the PMC(s) 302 and display 214. In further embodiments, the PMC(s) 302 may be replaced by individual cards and/or software partitions in a fly-by-wire system. In some embodiments, the PMC(s) 302 may work together with the autopilot module 316 or fly-by-wire system to detect and correct an overspeed, underspeed or over "g" condition by changing the thrust-producing device 304 power level.

Figure 6:
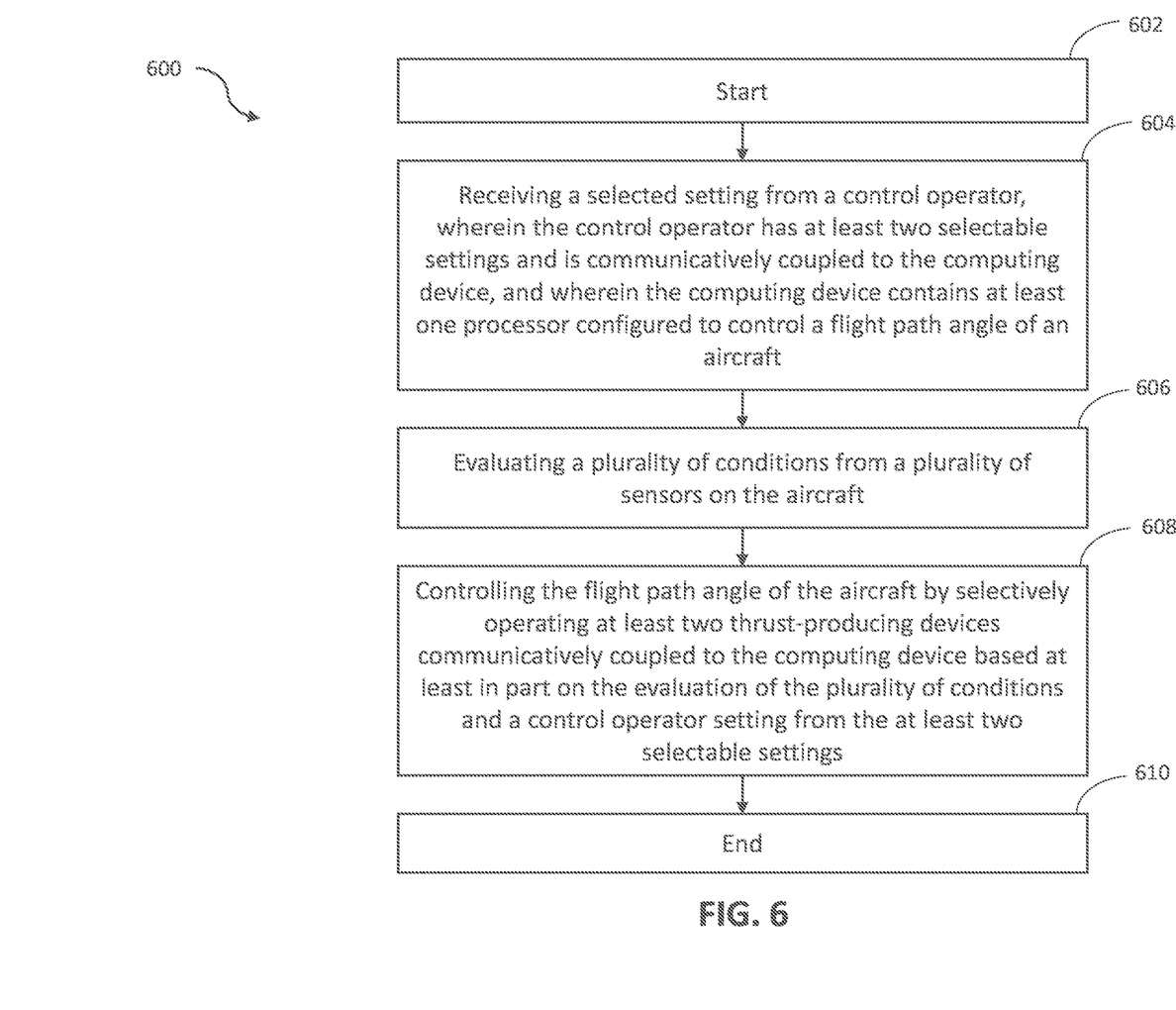
FIG. 6 is a flow chart block diagram of an example method of controlling an aircraft in accordance with some embodiments.

FIG. 6 is a flow chart block diagram of an example method 600 of controlling an aircraft in accordance with some embodiments. The example method 600 of controlling an aircraft starts at 602 and moves to step 604, which includes receiving, at a computing device 200, a selected setting from a control operator 102. The control operator 102 has at least two selectable settings, such as a mode of operation position for Takeoff/Climb 104, Cruise/Taxi 106, Descent/Approach 108, Off 110, or Reverse 112. The control operator 102 is communicatively coupled to the computing device 200, and the computing device 200 contains at least one processor 202 configured to control a flight path angle of an aircraft, such as through the algorithms, lookup tables, and/or machine learned models discussed above. At step 606 the computing device 200 moves on to evaluating a plurality of conditions from a plurality of sensors on the aircraft, where the plurality of conditions comprises input data from an air data module 306, an aircraft configuration module 308, a weight-on-wheels module 310 of the aircraft, the positions of power mechanisms 312, an aircraft attitude module 314, an autopilot module 316, and optionally a spoiler module 318. At step 608 the computing device 200 moves on to controlling the flight path angle of the aircraft by selectively operating at least two thrust-producing devices 304 communicatively coupled to the computing device 200 based at least in part on the evaluation of the plurality of conditions and a control operator 102 setting from the at least two selectable settings. Method 600 then ends at step 610.

Figure 7:
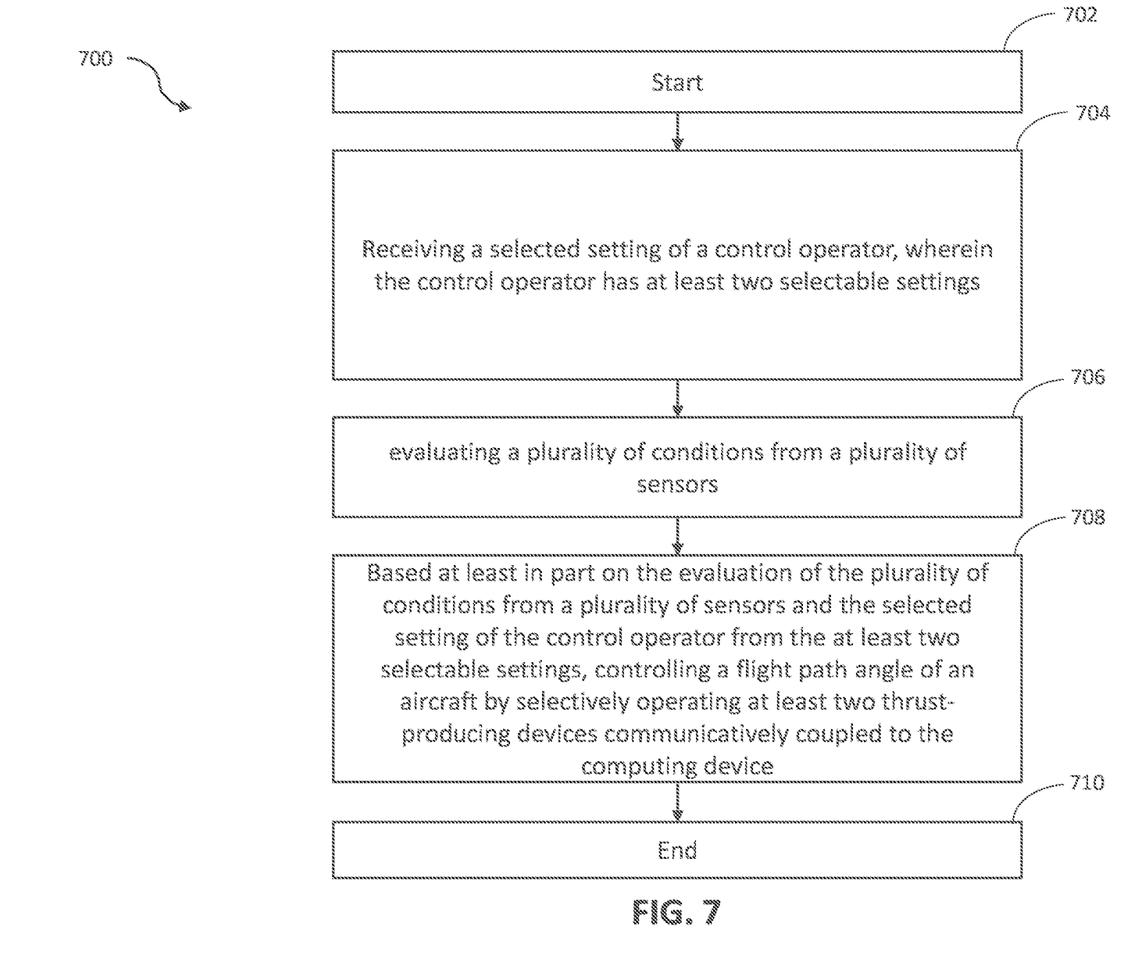
FIG. 7 is a flow chart depicting an example implementation of a set of instructions to control an aircraft in accordance with some embodiments.

FIG. 7 is a flow chart depicting an example implementation of a set of instructions 700 to control an aircraft in accordance with some embodiments. The set of instructions 700 are stored on a non-transitory computer readable medium, such as instruction memory 210 and/or working memory 212. The set of instructions 700 are executed by at least one processor 202, and cause the computing device 200 to perform operations corresponding to the set of instructions 700. The set of instructions 700 starts with step 702 and moves to step 704, where the computing device 200 performs the operation of receiving a selected setting of a control operator 102, wherein the control operator 102 has at least two selectable settings. At step 706 the computing device 200 performs the operation of evaluating a plurality of conditions from a plurality of sensors, where the plurality of conditions comprises input data from an air data module 306, an aircraft configuration module 308, a weight-on-wheels module 310 of the aircraft, the positions of power mechanisms 312, an aircraft attitude module 314, an autopilot module 316, and optionally a spoiler module 318. At step 708, the computing device 200 performs the operation of, based at least in part on the evaluation of the plurality of conditions from a plurality of sensors and the selected setting of the control operator 102 from the at least two selectable settings, controlling a flight path angle of an aircraft by selectively operating at least two thrust-producing devices 304 communicatively coupled to the computing device 200. The operation of step 708 by the computing device 200, may be performed based at least in part on the algorithms, lookup tables, and/or machine learned models as discussed above. The operation of the computing device 200 then ends at step 710.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term machine learned model, as used herein, includes data models created using machine learning. Machine learning, according to the present disclosure, may involve putting a model through supervised or unsupervised training. Machine learning can include models that may be trained to learn relationships between various groups of data. Machine learned models may be based on a set of algorithms that are designed to model abstractions in data by using a number of processing layers. The processing layers may be made up of levels of trainable filters, transformations, projections, hashing, pooling, and regularization. The models may be used in large-scale relationships-recognition tasks. The models can be created by using various open-source and proprietary machine learning tools known to those of ordinary skill in the art.

In accordance with some embodiments, a system for controlling an aircraft is provided. The system can include a computing device, wherein the computing device includes at least one processor configured to control a flight path angle of the aircraft, and wherein the aircraft is a blown lift aircraft. The system can also include a control operator communicatively coupled to the computing device, wherein the control operator is configured to have at least two selectable settings. The system can also include at least two thrust-producing devices operatively coupled to a pair of wings on the aircraft and communicatively coupled to the computing device. The computing device may control the flight path angle of the aircraft by selectively operating the at least two thrust-producing devices based on a plurality of conditions provided by a plurality of sensors on the aircraft and a selected setting of the control operator.

In accordance with some embodiments, the at least two selectable settings correspond to a mode of operation of the aircraft, wherein the mode of operation comprises takeoff, cruise, descent, off, and reverse.

In accordance with some embodiments, the computing device further includes a display adapted to display the plurality of conditions.

In accordance with some embodiments, the control operator is a lever configured to travel through a plurality of predefined selectable positions.

In accordance with some embodiments, the control operator includes a tunable adjuster configured to fine-tune a power level of the at least two thrust-producing devices.

In accordance with some embodiments, the control operator is a touchscreen on a user interface communicatively coupled to the computing device.

In accordance with some embodiments, the at least two thrust-producing devices are electric propulsion units.

In accordance with some embodiments, the at least one processor of the computing device is further configured to differentially control the at least two thrust-producing devices based on the plurality of conditions and a control operator setting from the at least two selectable settings.

In accordance with some embodiments, the plurality of conditions comprises inputs from one or more of an air data module, an aircraft configuration module, a weight-on-wheels module, a power mechanism position for the at least two thrust-producing devices, an aircraft attitude module, and an autopilot module.

In accordance with some embodiments, the at least one processor of the computing device is further configured to control the flight path angle of the aircraft using at least one of an algorithm, a lookup table, and a machine learned model.

In accordance with some embodiments, a method for controlling an aircraft is provided. The method can include receiving, at a computing device, a selected setting from a control operator. The control operator may have at least two selectable settings and may be communicatively coupled to the computing device. The computing device may contain at least one processor configured to control a flight path angle of a blown lift aircraft. The method can also include evaluating a plurality of conditions from a plurality of sensors on the aircraft. The method can further include controlling the flight path angle of the aircraft by selectively operating at least two thrust-producing devices communicatively coupled to the computing device based at least in part on the evaluation of the plurality of conditions and a control operator setting from the at least two selectable settings.

In accordance with some embodiments, the method further comprising receiving a tuning input from a tunable adjuster operatively coupled to the control operator, wherein the tuning input fine-tunes a power level of the at least two thrust-producing devices.

In accordance with some embodiments, the method further comprising operating, differentially, the at least two thrust-producing devices based on the evaluation of the plurality of conditions and the selected setting of the control operator from the at least two selectable settings.

In accordance with some embodiments, the method further comprising displaying the plurality of conditions to a user.

In accordance with some embodiments, the controlling step is based on the computing device calculating the flight path angle based at least in part on at least one of an algorithm, a lookup table, and a machine learned model.

In accordance with some embodiments, the at least two selectable settings correspond to a mode of operation of the aircraft.

In accordance with some embodiments, the control operator is a lever configured to travel through a plurality of predefined selectable positions.

In accordance with some embodiments, the control operator includes a tunable adjuster configured to fine-tune a power level of the at least two thrust-producing devices.

In accordance with some embodiments, the at least two thrust-producing devices are electric propulsion units.

In accordance with some embodiments, a non-transitory computer readable medium having instructions stored thereon is provided. The instructions, when executed by at least one processor, may cause a computing device to perform operations. The operations can include receiving a selected setting of a control operator. The control operator can have at least two selectable settings. The operations can also include evaluating a plurality of conditions from a plurality of sensors. The operations may further include, based at least in part on the evaluation of the plurality of conditions from a plurality of sensors and the selected setting of the control operator from the at least two selectable settings, controlling a flight path angle of a blown lift aircraft by selectively operating at least two thrust-producing devices communicatively coupled to the computing device.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A system for controlling an aircraft comprising:
   a computing device, wherein the computing device includes at least one processor configured to control a flight path angle of the aircraft;
   a control operator communicatively coupled to the computing device, wherein the control operator comprises a plurality of selectable predefined settings comprising at least cruise, off, and reverse, wherein a desired flight path angle is determined by a selected predefined setting of the plurality of selectable predefined settings;

a tunable adjuster operatively coupled to the control operator; and at least one thrust-producing device operatively coupled to each wing of a pair of wings of the aircraft and communicatively coupled to the computing device, wherein the computing device controls the flight path angle of the aircraft by selectively operating the at least one thrust-producing device on each wing based on a comparison of a calculated flight path angle of the aircraft and the desired flight path angle such that responsive to determining the desired flight path angle is not achieved, the computing device is configured to adjust a power level of at least one of the at least one thrust-producing device on each wing to achieve the desired flight path angle, wherein the control operator is configured to provide coarse adjustment of the power level of the at least one thrust-producing device operatively coupled to each wing based on the selected predefined setting and the tunable adjuster is configured to provide fine adjustment of the power level of the at least one thrust-producing device operatively coupled to each wing.

2. The system of claim 1, wherein the computing device further includes a display adapted to display a plurality of conditions.

3. The system of claim 1, wherein the control operator is a lever configured to travel through the plurality of selectable predefined settings.

4. The system of claim 1, wherein the plurality of selectable predefined settings further include takeoff and descent.

5. The system of claim 1, wherein the reverse setting of the plurality of selectable predefined settings is gated off.

6. The system of claim 1, wherein the control operator is a touchscreen on a user interface communicatively coupled to the computing device.

7. The system of claim 1, wherein the at least one thrust-producing device on each wing are electric propulsion units.

8. The system of claim 1, wherein the at least one processor of the computing device is further configured to differentially control the at least one thrust-producing device on each wing based on a plurality of conditions provided by a plurality of sensors on the aircraft and a control operator setting from the plurality of selectable predefined settings.

9. The system of claim 8, wherein the plurality of conditions comprises inputs from one or more of an air data module, an aircraft configuration module, a weight-on-wheels module, a power mechanism position for the at least one thrust-producing device on each wing, an aircraft attitude module, and an autopilot module.

10. The system of claim 1, wherein the at least one processor of the computing device is further configured to control the flight path angle of the aircraft using at least one of an algorithm, a lookup table, and a machine learned model.

11. A method for controlling an aircraft comprising:

receiving, at a computing device, a desired flight path angle determined by a selected predefined setting from a control operator, wherein the control operator has a plurality of selectable predefined settings comprising at least cruise, off, and reverse, wherein the control operator is communicatively coupled to the computing device, and wherein the computing device contains at least one processor configured to control a flight path angle of the aircraft;

evaluating a plurality of conditions from a plurality of sensors on the aircraft to determine a calculated flight path angle;

controlling the flight path angle of the aircraft by selectively operating at least one thrust-producing device on each wing of a pair of wings of the aircraft, wherein the at least one thrust-producing device on each wing is communicatively coupled to the computing device, and wherein controlling the flight path angle of the aircraft is based on a comparison of the calculated flight path angle and the desired flight path angle such that responsive to a determination that the desired flight path angle is not achieved, a power level of at least one of the at least one thrust-producing device on each wing is adjusted to achieve the desired flight path angle; and receiving a tuning input from a tunable adjuster operatively coupled to the control operator, wherein the control operator is configured to provide coarse adjustment of the power level of the at least one thrust-producing device operatively coupled to each wing based on the selected predefined setting and the tunable adjuster is configured to provide fine adjustment of the power level of the at least one thrust-producing device operatively coupled to each wing.

12. The method of claim 11, further comprising operating, differentially, the at least one thrust-producing device on each wing.

13. The method of claim 11, further comprising displaying a plurality of conditions to a user.

14. The method of claim 11, wherein the controlling step is based at least in part on at least one of an algorithm, a lookup table, and a machine learned model.

15. The method of claim 11, wherein the plurality of selectable predefined settings correspond to modes of operation of the aircraft.

16. The method of claim 11, wherein the plurality of selectable predefined settings further include takeoff and descent.

17. The method of claim 11, wherein the at least one thrust-producing device on each wing are electric propulsion units.

18. A non-transitory computer readable medium having instructions stored thereon, wherein the instructions, when executed by at least one processor, cause a computing device to perform operations comprising:

receiving a desired flight path angle determined by a selected predefined setting of a control operator, wherein the control operator comprises a plurality of selectable predefined settings comprising at least cruise, off, and reverse;

evaluating a plurality of conditions from a plurality of sensors to determine a calculated flight path angle;

controlling a flight path angle of an aircraft by selectively operating at least one thrust-producing device on each wing of a pair of wings of the aircraft based on a comparison of the calculated flight path angle and the desired flight path angle such that responsive to a determination that the desired flight path angle is not achieved, a power level of the at least one thrust-producing device on each wing is adjusted to achieve the desired flight path angle; and receiving a tuning input from a tunable adjuster operatively coupled to the control operator, wherein the control operator is configured to provide coarse adjustment of the power level of the at least one thrust-producing device operatively coupled to each wing based on the selected predefined setting and the tunable adjuster is configured to provide fine adjustment of the power level of the at least one thrust-producing device operatively coupled to each wing.

* * * * *